US008647082B2

(12) United States Patent
Naito et al.

(10) Patent No.: US 8,647,082 B2
(45) Date of Patent: Feb. 11, 2014

(54) FUEL PUMP

(75) Inventors: Hiroaki Naito, Inazawa (JP);
Kazumichi Hanai, Nagoya (JP)

(73) Assignee: Aisan Kogyo Kabushiki Kaisha, Obu-Shi, Aichi-Ken (JP)

( * ) Notice: Subject to any disclaimer, the term of this patent is extended or adjusted under 35 U.S.C. 154(b) by 403 days.

(21) Appl. No.: 12/946,706

(22) Filed: Nov. 15, 2010

(65) Prior Publication Data

US 2011/0116955 A1    May 19, 2011

(30) Foreign Application Priority Data

Nov. 16, 2009    (JP) .................................. 2009-261208

(51) Int. Cl.
*H02K 21/38*    (2006.01)

(52) U.S. Cl.
USPC ................................... 417/423.7; 310/154.18

(58) Field of Classification Search
USPC ...................... 417/423.7; 310/154.01, 154.02, 310/154.17–19, 154.26, 154.47
See application file for complete search history.

(56) References Cited

U.S. PATENT DOCUMENTS

| 2,479,455 | A | * | 8/1949 | Aronoff | .................... | 310/154.18 |
| 3,083,310 | A | * | 3/1963 | Tweedy et al. | ........... | 310/154.18 |
| 4,542,314 | A |   | 9/1985 | Corbach et al. | | |
| 4,973,871 | A | * | 11/1990 | Bisantz | .................... | 310/154.17 |
| 5,117,931 | A |   | 6/1992 | Nishida | | |
| 6,109,887 | A | * | 8/2000 | Takura et al. | ................. | 417/348 |

FOREIGN PATENT DOCUMENTS

| JP | 56-089679 | 7/1981 |
| JP | S59-34487 | 2/1984 |
| JP | S60-39354 | 3/1985 |
| JP | 60-261344 | 12/1985 |
| JP | H01-146774 | 10/1989 |
| JP | H02290147 | 11/1990 |
| JP | 6-086484 | 3/1994 |
| JP | H1189123 | 3/1999 |
| JP | P3083310 | 9/2000 |
| JP | 2003-309939 | 10/2003 |
| JP | 2005094972 | 4/2005 |
| JP | 2006050816 | 2/2006 |
| JP | 2008099479 | 4/2008 |
| WO | WO93/22778 | 11/1993 |

OTHER PUBLICATIONS

English Abstract of Japanese Patent Application JP 60-261344.
Concise Explanation for Japanese Publication JP H01-146774.

(Continued)

*Primary Examiner* — Charles Freay
*Assistant Examiner* — Patrick Hamo
(74) *Attorney, Agent, or Firm* — Vierra Magen Marcus LLP

(57) ABSTRACT

A fuel pump may include a motor section comprising a rotor and a stator. One of the rotor and the stator may have at least a pair of permanent magnet parts disposed along a first circumferential surface at an interval in a circumferential direction, and at least two magnetic material parts disposed between ends of adjacent permanent magnet parts. The other one of the rotor and the stator may have a first yoke disposed so as to face the permanent magnet parts, wherein a plurality of slots are formed on the first yoke at an interval in the circumferential direction. A surface facing the slots of the magnetic material parts may be shifted, in at least a partial range in the circumferential direction including a permanent magnet part side end where a polarity of a first circumferential surface side is a north pole, from the first circumferential surface in a direction along which a distance to the slots increases.

10 Claims, 16 Drawing Sheets

(56) References Cited

OTHER PUBLICATIONS

Machine English Translation of Japanese Patent JP 2003-309939, obtained from the website of Japanese Patent Office.
Patent family list for JP 6-086484.
Notification of Reasons for Rejection dated May 21, 2013 in Japanese Patent Application No. 2009-261208, 7 pages.
Family List, English Abstract and Machine Translation of JP2005094972 published Apr. 7, 2005.
English Abstract and Machine Translation of JPH1189123 published Mar. 30, 1999.
English Abstract of JPH02290147 published Nov. 30, 1990.
English Abstract and Machine Translation of JP2006050816 published Feb. 16, 2006.
English Abstract and Machine Translation of JP2008099479 published Apr. 24, 2008.
Office Action dated Dec. 24, 2013 in Japanese Patent Application No. 2009-261208, 3 pages.
English Abstract of JP P3083310 published Sep. 4, 2000 retrieved from http://worldwide.espacenet.com/publicationDetails/biblio?CC=JP&NR=3083310B2&KC=B2&FT=D&ND=4&date=20000904&DB=EPODOC&locale=en_EP, Dec. 27, 2013.
Bibliographic Data of JP S60-39354 published Jun. 2, 1992 retrieved from http://worldwide.espacenet.com/publicationDetails/biblio?DB=EPODOC&II=0&ND=3&at=7&locale=en_EP&FT=D&CC=JP&NR=S6039354A&KC=A, Dec. 27, 2013.
English Abstract of JPS5934487 published Feb. 24, 1984 retrieved from http://worldwide.espacenet.com/publicationDetails/biblio?DB=EPODOC&II=1&ND=3&adjacent=true&locale=en_EP&FT=D&date=19840224&CC=JP&NR=S5934487A&KC=A, Dec. 27, 2013.

\* cited by examiner

First Embodiment

First Modified Embodiment

First Comparative Embodiment

Third Comparative Embodiment

Fourth Comparative Embodiment

Second Embodiment

Third Embodiment

Seventh Comparative Embodiment

Fourth Embodiment

Eighth Comparative Embodiment

FUEL PUMP

CROSS-REFERENCE TO RELATED APPLICATION

This application claims priority to Japanese Patent Application No. 2009-261208 filed on Nov. 16, 2009, the contents of which are hereby incorporated by reference into the present application.

TECHNICAL FIELD

The present application relates to a fuel pump for drawing in a fuel such as gasoline etc., increasing the pressure thereof, and discharging this pressurized fuel.

DESCRIPTION OF RELATED ART

A fuel pump of this type normally has a motor section and a pump section that is driven by the motor section. When the pump section is driven by the motor section, fuel outside of the fuel pump is drawn into the fuel pump to be pressurized and discharged from the fuel pump. With this fuel pump, a torque generated by the motor section must be increased in order to increase pump output. Therefore, for the purpose of increasing an effective magnetic flux, a permanent magnet whose cross section perpendicular to a rotational axis of the motor has an arc-like shape (C-shape) (hereinafter, may also be simply referred to as an arc-like permanent magnet) is used in the motor section. An example of such a fuel pump is disclosed in Japanese Patent Application Publication No. H6-86484.

However, while the use of an arc-like permanent magnet in the motor section enables an increase in the effective magnetic flux of the permanent magnet, a cogging torque is generated at the motor section. Consequently, a technique for reducing a cogging torque of a motor section has been developed (e.g., Japanese Utility Model Registration Publication No. S56-89679). According to the technique described in Japanese Utility Model Registration Publication No. S56-89679, the arc-like permanent magnets are attached to an inner circumferential surface of a housing, and magnetic conductive pieces (magnetic material parts) are disposed between the adjacent permanent magnets. Due to the magnetic conductive pieces, a magnetic path from one permanent magnet to another is formed and a magnetic distribution in a circumferential direction of the motor section becomes gradual. Accordingly, the cogging torque of the motor section is reduced.

SUMMARY

In the technique described in Japanese Utility Model Registration Publication No. S56-89679, an inner circumferential surface of a magnetic conductive piece conforms to an inner circumferential surface of an arc-like permanent magnet. Consequently, a part of a magnetic flux flowing from one permanent magnet to a rotor inadvertently flows to the magnetic conductive piece and not towards the other permanent magnet. As a result, an effective magnetic flux flowing to the rotor decreases by just the amount flowed from the permanent magnet to the magnetic conductive piece, causing a drop in the output of the motor section.

It is an object of the present teachings to provide a fuel pump capable of improving the output of the motor section while suppressing the cogging torque.

In one aspect of the present teachings, a fuel pump may comprise a motor section and a pump section driven by the motor section. The motor section may comprise a rotor and a stator facing the rotor. The rotor may comprise at least two permanent magnet parts and at least two magnetic material parts. Each of the permanent magnet parts is disposed along a first circumferential surface at an interval in a circumferential direction. Each of the magnetic material parts is disposed between adjacent permanent magnet parts. The permanent magnet parts may comprise a first permanent magnet part and a second permanent magnet part that composes a pair. A polarity of an outer surface of the first permanent magnet part is a north pole, and a polarity of an outer surface of the second permanent magnet part is a south pole. The stator may comprise a first yoke facing the permanent magnet parts. The first yoke may have a plurality of slots disposed along a second circumferential surface at an interval in the circumferential direction. The second circumferential surface is coaxial to the first circumferential surface. Each of the outer surfaces of the permanent magnet parts is disposed on the first circumferential surface. Each of inner surfaces of the slots is disposed on the second circumferential surface, and faces the outer surface of the permanent magnet part. Each of the magnetic material parts has a surface facing the slots. The facing surface may include a region shifted from the first circumferential surface toward a radially inner side. At least a part of the shifted region in an axial direction is positioned in a range where the slots faces the permanent magnet parts, and the shifted region in the circumferential direction is formed in an area including at least a first permanent magnet part side end of the magnetic material part.

In this fuel pump, since the magnetic material part is disposed between the adjacent permanent magnet parts, a magnetic distribution in the circumferential direction of the motor section becomes gradual and a cogging torque of the motor section can be reduced. In addition, the facing surface of the magnetic material part shifts, in at least the partial area in the circumferential direction, from the first circumferential surface in a direction along which a distance to the slot increases, and at least the partial area includes the first permanent magnet part side end of the magnetic material part. Therefore, an inadvertent flow of a magnetic flux from the first permanent magnet part to the magnetic material part is suppressed and a magnetic flux to be utilized as an effective magnetic flux increases. Consequently, output of the motor section can be improved.

In another aspect of the present teachings, a fuel pump may comprise a motor section and a pump section driven by the motor section. The motor section may comprise a rotor and a stator facing the rotor. The stator may comprise at least two permanent magnet parts and at least two magnetic material parts. Each of the permanent magnet parts is disposed along a first circumferential surface at an interval in a circumferential direction. Each of the magnetic material parts is disposed between adjacent permanent magnet parts. The permanent magnet parts may comprise a first permanent magnet part and a second permanent magnet part that composes a pair. A polarity of an inner surface of the first permanent magnet part is a north pole, and a polarity of an inner surface of the second permanent magnet part is a south pole. The rotor may comprise a first yoke facing the permanent magnet parts. The first yoke may have a plurality of slots disposed along a second circumferential surface at an interval in the circumferential direction. The second circumferential surface is coaxial to the first circumferential surface. Each of the inner surfaces of the permanent magnet parts is disposed on the first circumferential surface. Each of the outer surfaces of the slots is disposed on the second circumferential surface, and faces the inner surface of the permanent magnet part. Each of the magnetic material parts has a surface facing the slots. The facing surface may include a region shifted from the first circumferential surface toward a radially outer side. At least a part of the shifted region in an axial direction is positioned in a range where the slots faces the permanent magnet parts, and the shifted region in the circumferential direction is formed in an area including at least a first permanent magnet part side end of the magnetic material part. This fuel pump can also improve an output of the motor section while suppressing a cogging torque.

DETAILED DESCRIPTION OF EMBODIMENT

Figure 1:
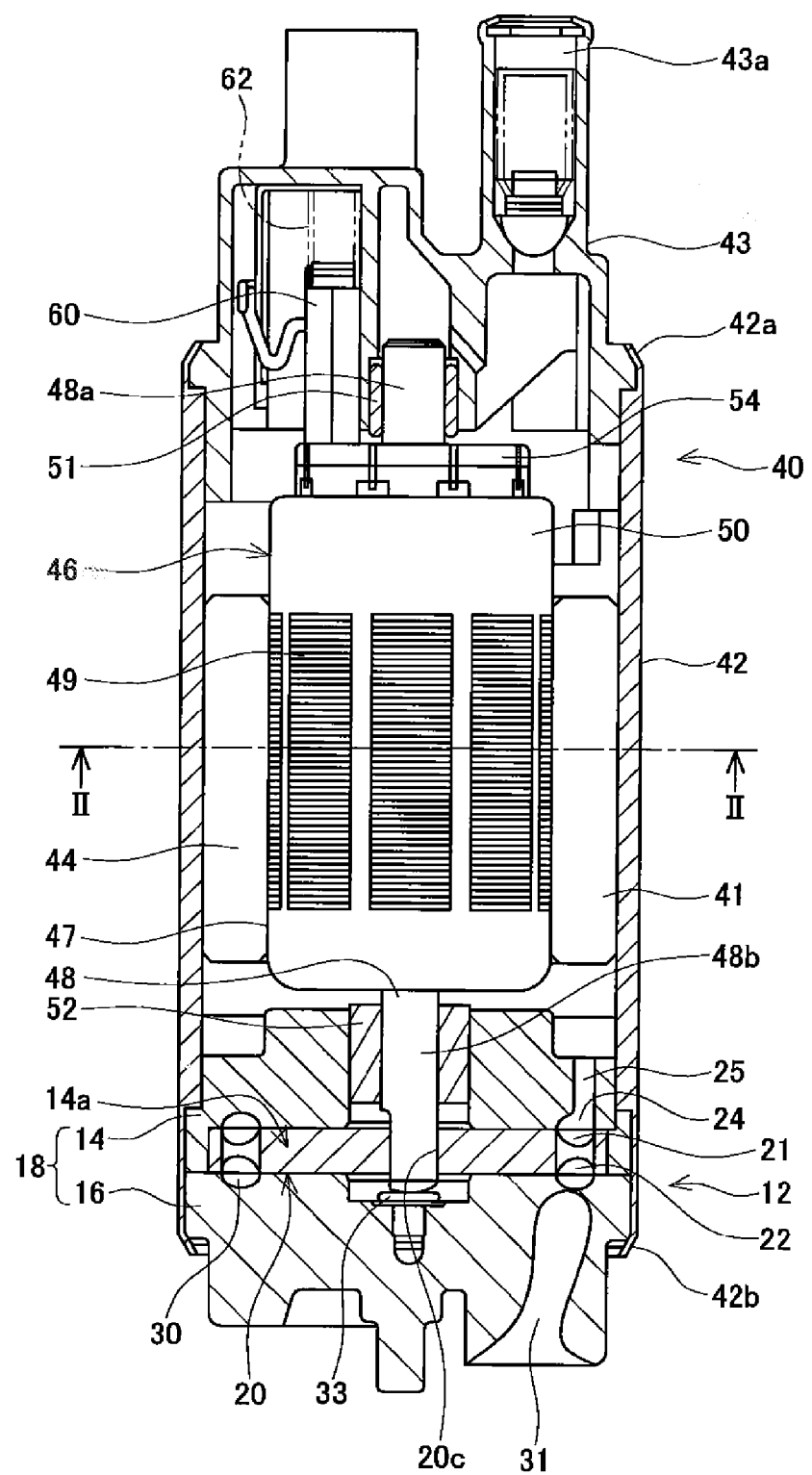
FIG. 1 is a vertical cross-sectional view of a fuel pump according to a first embodiment.

In one aspect of the present teachings, the shifted region of the magnetic material part may be formed in an entire circumferential area from the first permanent magnet part side end of the magnetic material part to a second permanent magnet part side end of the magnetic material part.

In another aspect of the present teachings, a distance from the first circumferential surface to the first permanent magnet part side end of the facing surface may be shorter than a distance from the first circumferential surface to the second permanent magnet part side end of the facing surface.

In one embodiment of the present teachings, the rotor may include permanent magnet parts and magnetic material parts, and further comprise a second yoke fixed to inner surfaces of the permanent magnet parts. Each of the magnetic material parts may be a plate member. One end of the plate member may make contact with the adjacent first permanent magnet part, and another end of the plate member may make contact with the adjacent second permanent magnet part. A first gap between the plate member and the second yoke may be provided in at least a part of the plate member in the circumferential direction, and a second gap between the plate member and the first circumferential surface may be provided in at least a part of the plate member in the circumferential direction.

In another embodiment of the present teachings, the stator may include permanent magnet parts and magnetic material parts, and further comprise a housing fixed to the outer surface of the permanent magnet part. Each of the magnetic material parts may be a plate member. One end of the plate member may make contact with the adjacent first permanent magnet part, and another end of the plate member may make contact with the adjacent second permanent magnet part. A first gap between the plate member and the housing may be provided in at least a part of the plate member in the circumferential direction, and a second gap between the plate member and the first circumferential surface may be provided in at least a part of the plate member in the circumferential direction.

In another embodiment of the present teachings, the rotor may further comprise a shaft, a forth yoke fixed to the shaft, and at least two permanent magnets disposed within the forth yoke. The forth yoke may comprise a second yoke portion and at least two third yoke portions. The second yoke portion may make contact with inner surfaces of the permanent magnets. Each of the third yoke portions may make contact with an outer surface of a corresponding permanent magnet. An outer surface of each of the third yoke portions is disposed on the first circumferential surface, and the third yoke portions are separated from the second yoke portion by a space disposed within the forth yoke. Each of the permanent magnet parts may be configured by one of the permanent magnets and the corresponding third yoke portion. Each of the magnetic material parts may be configured by a part of the second yoke portion. The part of the second yoke portion may be disposed between the adjacent third yoke portions. "Separated by a space", as used herein, includes not only a case in which the third yoke portion is completely separated by a space from the second yoke portion but also a case in which a part of the third yoke portion is coupled to a part of the second yoke portion.

Representative, non-limiting embodiments of the present teachings will now be described in further detail with reference to the attached drawings. This detailed description is merely intended to teach a person of skill in the art further details for practicing preferred aspects of the present teachings and is not intended to limit the scope of the claims. Furthermore, each of the additional features and teachings disclosed below may be utilized separately or in conjunction with other features and teachings to provide improved fuel pumps.

First Embodiment

A fuel pump according to a first embodiment of the present teachings will be described with reference to the drawings. First, a schematic configuration of an entire fuel pump 10 will be described. The fuel pump 10 is for a vehicle and is operated while being immersed in fuel in a fuel tank to supply fuel to an engine. As shown in FIG. 1, the fuel pump 10 comprises a motor section 40 and a pump section 12.

The motor section 40 comprises a housing 42, a motor cover 43, magnets 41 and 44, and a rotor 46. The housing 42 is formed in an approximately cylindrical shape. The motor cover 43 is fixed to the housing 42 by swaging inward an upper end 42a (top/down of FIG. 1 is assumed to be top/down of the fuel pump 10) of the housing 42. A discharge port 43a is formed on the motor cover 43. The magnets 41 and 44 are fixed to an inner surface of the housing 42. Magnetic material pieces 56a and 56b (to be described in detail later) are disposed between the magnets 41 and 44 (refer to FIG. 2).

The rotor 46 has a main body 47 and a shaft 48 that vertically penetrates the main body 47. The main body 47 comprises a core (yoke) 49 fixed to the shaft 48, a coil (not shown in FIG. 1) wound around the core 49, and a resin portion 50 that fills the periphery of the coil. A commutator 54 is provided on an upper end of the main body 47. A brush 60 abuts an upper end surface of the commutator 54. The brush 60 is biased downward by a spring 62 having one end fixed to the motor cover 43. As the brush 60 wears down, the brush 60 moves downward in correspondence to the wear to maintain an abutted state between the brush 60 and the commutator 54. An upper end 48a of the shaft 48 is rotatably mounted to the motor cover 43 via a bearing 51. A lower end 48b of the shaft 48 is rotatably mounted to a pump cover 14 of the pump section 12 via a bearing 52.

The pump section 12 comprises a casing 18 and an impeller 20. The impeller 20 has an approximately disk-like shape. Concavities 21 are consecutively formed in a circumferential direction at an outer circumferential portion on an upper surface of the impeller 20. In a similar manner, concavities 22 are consecutively formed in a circumferential direction at an outer circumferential portion on a lower surface of the impeller 20. The respective concavities 21 on the upper surface of the impeller 20 communicate at bottoms thereof to the respective concavities 22 on the lower surface of the impeller 20. In addition, a through hole into which the shaft 48 fits is formed at the center of the impeller 20.

The casing 18 comprises a pump cover 14 and a pump body 16. A recessed region 14a that is circular in plan view is formed on an impeller-side surface (i.e., a lower surface) of the pump cover 14. A depth of the recessed region 14a is set approximately equal to a thickness of the impeller 20. The impeller 20 is rotatably disposed within the recessed region 14a.

The casing 18 (the pump cover 14 and the pump body 16) is fixed to the housing 42 by having a lower end 42b of the housing 42 swaged inward in a state where the impeller 20 is embedded to the recessed region 14a of the pump cover 14. The lower end 48b of the shaft 48 is fitted into the through hole of the impeller 20 at a position further downward from a position supported by the bearing 52. Therefore, as the rotor 46 rotates, the impeller 20 rotates concomitantly. A thrust bearing 33 that receives a thrust load of the rotor 46 is interposed between the lower end of the shaft 48 and the pump body 16.

A groove 30 that is approximately C-shaped in plan view is formed on a surface on the side of the impeller 20 (i.e., the upper surface as shown in FIG. 1) of the pump body 16. The groove 30 is formed in an area facing the group of concavities 22 on the lower surface of the impeller 20. An upstream end of the groove 30 communicates with a fuel intake port 31. The fuel intake port 31 continues from the groove 30 to a lower surface (i.e., the lower surface as shown in FIG. 1) of the pump body 16. The fuel intake port 31 communicates the groove 30 to the outside of the casing 18.

A groove 24 that is approximately C-shaped in plan view is formed on a bottom surface of the recessed region 14a of the pump cover 14. The groove 24 is formed in an area facing the group of concavities 21 on the upper surface of the impeller 20. A downstream end 24b of the groove 24 communicates with a fuel discharge hole 25. The fuel discharge hole 25 continues from the groove 24 to an upper surface (the upper surface as shown in FIG. 1) of the pump cover 14. The fuel discharge hole 25 communicates the groove 24 to the outside of the casing 18.

When the impeller 20 rotates in the fuel pump 10, fuel is drawn into the casing 18 from the fuel intake port 31 of the pump body 16. The fuel drawn into the casing 18 flows through a fuel flow channel constituted from the group of concavities 22 on the lower surface of the impeller 20 and the groove 30 of the pump body 16 and a fuel flow channel constituted from the group of concavities 21 on the upper surface of the impeller 20 and the groove 24 of the pump cover 14, while being pressurized from an upstream side towards a downstream side. The fuel pressurized in the casing 18 travels through the fuel discharge hole 25 and is pumped into the housing 42 of the motor section 40. The fuel pumped into the housing 42 flows upward through the housing 42 and is discharged from the discharge port 43a of the motor cover 43.

Figure 2:
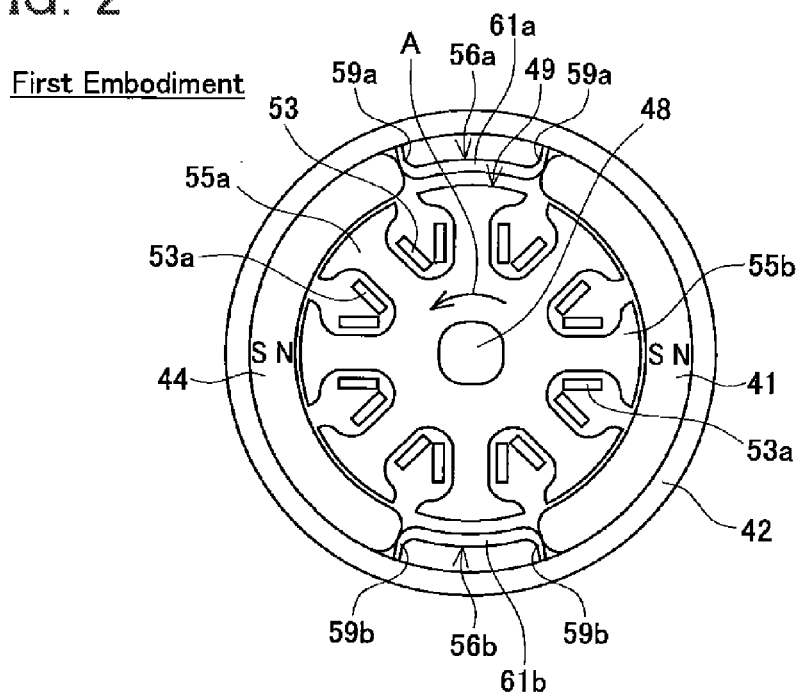
FIG. 2 is a cross-sectional view taken along II-II in FIG. 1.

Next, a configuration of the motor section 40 (in particular, the core 49 of the rotor 46, the magnets 41 and 44, and the magnetic material pieces 56a and 56b) will be described in detail with reference to FIG. 2. As shown in FIG. 2, a plurality of slots 55 (55a, 55b, ...) is formed on an outer circumference of the core (yoke) 49 of the rotor 46. The plurality of slots 55 is disposed at an interval in the circumferential direction. Each of front end surfaces (i.e., outer circumferential surfaces) of the plurality of slots 55 is positioned on a same circumference whose center is the center of the shaft 48.

Coils 53 are wound around slots 55 that face each other with the shaft 48 in between. For embodiment, a coil 53a is wound around slots 55a and 55b that face each other with the shaft 48 in between. (In FIG. 2, the coil 53 wound around the slots 55 is simplistically shown as a rectangular shape). A current flows through the coil 53 via the commutator 54. A direction in which the current of the coil 53 flows is set such that when the current flows through the coil 53, the rotor 46 rotates in a direction indicated by the arrow A in FIG. 2.

The magnets 41 and 44 are disposed outside of the rotor 46. The magnet 41 faces the magnet 44 with the rotor 46 in between. Cross sections of the magnets 41 and 44 in a direction perpendicular to the axis of the shaft 48 have arc-like shapes (i.e., C-shapes). The magnets 41 and 44 extend in the axis direction of the shaft 48 and face the core 49 in all axial areas where the core 49 is disposed (refer to FIG. 1). Inner circumferential surfaces of the magnets 41 and 44 are positioned on a same circumference whose center is the center of the shaft 48 and face the front end surfaces (i.e., outer circumferential surfaces) of the slots 55 with a predetermined interval (gap) in between. The inner circumferential surface of the magnet 41 is magnetized to a south pole and the outer circumferential surface of the magnet 41 is magnetized to a north pole. On the other hand, the inner circumferential surface of the magnet 44 is magnetized to a north pole and the outer circumferential surface of the magnet 44 is magnetized to a south pole. The outer circumferential surfaces of the magnets 41 and 44 are fixed to an inner wall of the housing 42. The housing 42 is formed by a magnetic material.

Magnetic material pieces 56a and 56b made of a plate member of a magnetic material (e.g., iron) are disposed between the magnets 41 and 44. The magnetic material pieces 56a and 56b extend in the axis direction of the shaft 48 in the same manner as the magnets 41 and 44, and face the core 49 in all axial areas where the core 49 is disposed. As shown in FIG. 2, at cross sections perpendicular to the axis of the shaft 48, the magnetic material pieces 56a and 56b comprise ends 59a and 59b extending from the housing 42 to the side of the shaft 48 and central portions 61a and 61b (i.e., portions extending in the circumferential direction) that connect both ends. One of the ends 59a and 59b of the magnetic material pieces 56a and 56b abuts the housing 42 and also abuts the magnet 41. The other of the ends 59a and 59b of the magnetic material pieces 56a and 56b abuts the housing 42 and also abuts the magnet 44. The central portions 61a and 61b of the magnetic material pieces 56a and 56b are shifted toward the housing 42 from a circumferential surface formed by extending the inner circumferential surfaces of the magnets 41 and 44. In other words, gaps between the central portions 61a and 61b of the magnetic material pieces 56a and 56b and the core 49 are set greater than gaps between the inner circumferential surfaces of the magnets 41 and 44 and the core 49. Moreover, the gaps between the central portions 61a and 61b of the magnetic material pieces 56a and 56b and the core 49 are set approximately constant in the circumferential direction. In addition, spaces (gaps) are formed between the central portions 61a and 61b of the magnetic material pieces 56a and 56b and the housing 42 in order to prevent the central portions 61a and 61b of the magnetic material pieces 56a and 56b and the housing 42 from coming into contact with each other.

Figure 3:
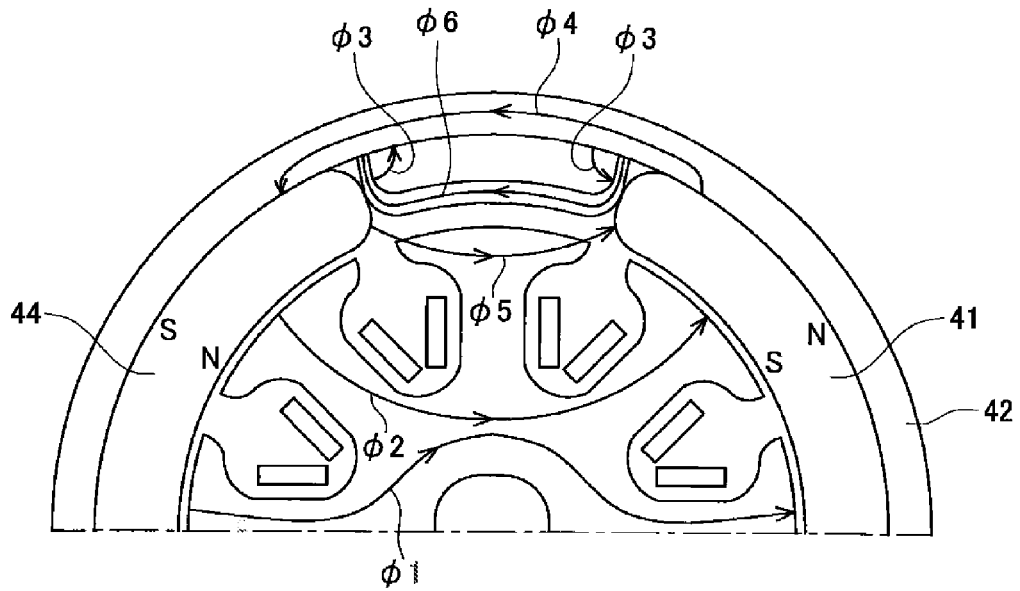
FIG. 3 is a diagram for explaining a flow of a magnetic flux of a motor section of the fuel pump according to the first embodiment.

Next, a flow of a magnetic flux of the motor section 40 will be explained. As shown in FIG. 3, magnetic fluxes φ1 and φ2 emitted from the center of the inner circumferential surface (i.e., north pole-side surface) of the magnet 44 flow through the core (yoke) 49 of the rotor 46 to the inner circumferential surface (i.e., south pole-side surface) of the magnet 41. In addition, since a relatively large gap is formed between the core (yoke) 49 and the magnetic material piece 56a, a magnetic flux φ5 emitted from an end of the magnet 44 flows through the core (yoke) 49 to the inner circumferential surface (i.e., south pole-side surface) of the magnet 41 (Refer to the third comparative embodiment described later). In other words, the magnetic flux φ5 is utilized as an effective magnetic flux for conversion into a rotational torque of the rotor 46. Furthermore, with magnetic fluxes φ4 and φ6 emitted from the outer circumferential surface (i.e., north pole-side surface) of the magnet 41, a part φ4 of the magnetic fluxes flows through the inside of the housing 42 to the outer circumferential surface (i.e., south pole-side surface) of the magnet 44, while another part φ6 of the magnetic fluxes flows through the magnetic material piece 56a from the side of the magnet 41 to the side of the magnet 44. Therefore, a magnetic distribution in a circumferential direction of the motor section 40 becomes gradual and a cogging torque is reduced.

Figure 4:
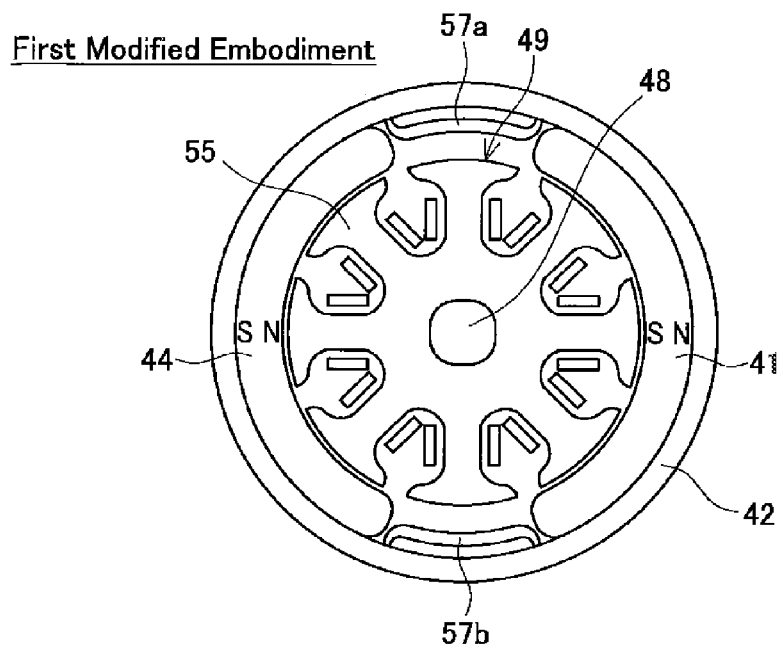
FIG. 4 is a cross-sectional view of a motor section of a fuel pump according to a first modified embodiment (a cross section corresponding to II-II in FIG. 1).
Figure 5:
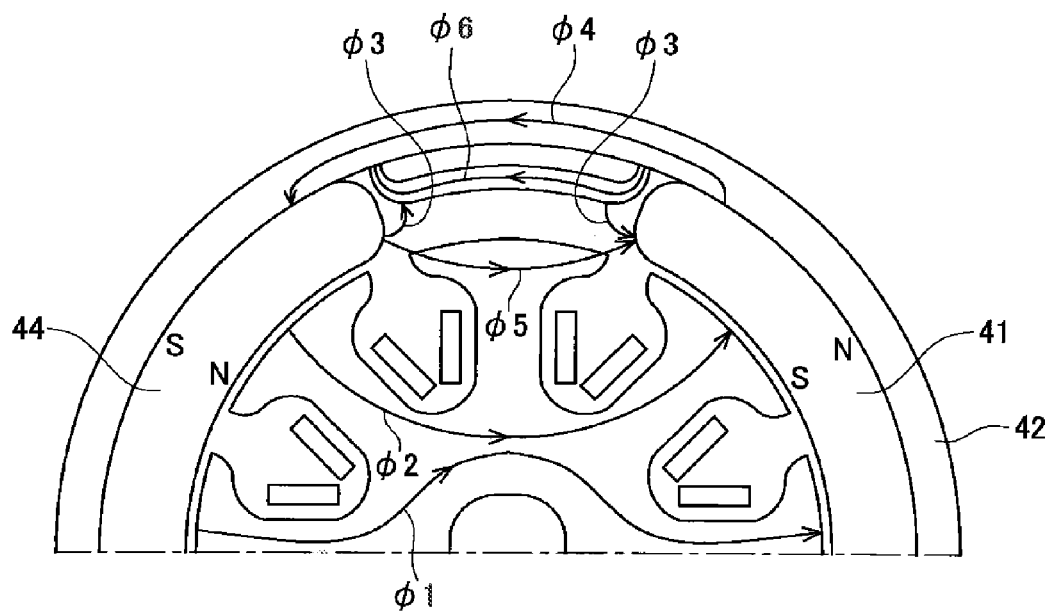
FIG. 5 is a diagram for explaining a flow of a magnetic flux of the motor section of the fuel pump according to the first modified embodiment.

Many modifications can be adopted for the magnetic material pieces to be disposed between the magnets 41 and 44. For example, magnetic material pieces 57a and 57b as used in a first modified embodiment illustrated in FIG. 4 can be adopted. As shown in FIG. 4, the magnetic material pieces 57a and 57b have greater gaps between a core (yoke) 49 of a rotor 46 as compared to the first embodiment. In addition, the ends of the magnetic material pieces 57a and 57b are not in contact with the magnets 41 and 44. Even when such magnetic material pieces 57a and 57b are used, as illustrated in FIG. 5, a part φ5 of the magnetic flux emitted from the end of the magnet 44 flows through the core (yoke) 49 to the inner circumferential surface (i.e., south pole-side surface) of the magnet 41. In addition, a part φ6 of the magnetic flux emitted from the outer circumferential surface (i.e., north pole-side surface) of the magnet 41 flows through the magnetic material piece 56a from the side of the magnet 41 to the side of the magnet 44. Consequently, an output of the motor section 40 can be improved while reducing a cogging torque.

Figure 6:
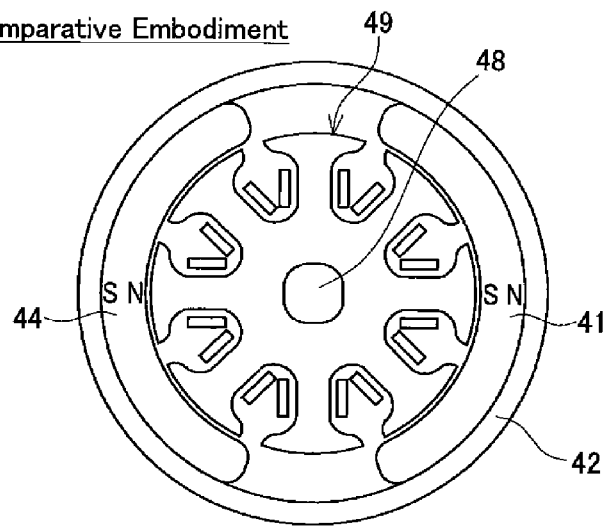
FIG. 6 is a cross-sectional view of a motor section of a fuel pump according to a first comparative embodiment (a cross section corresponding to II-II in FIG. 1).
Figure 7:
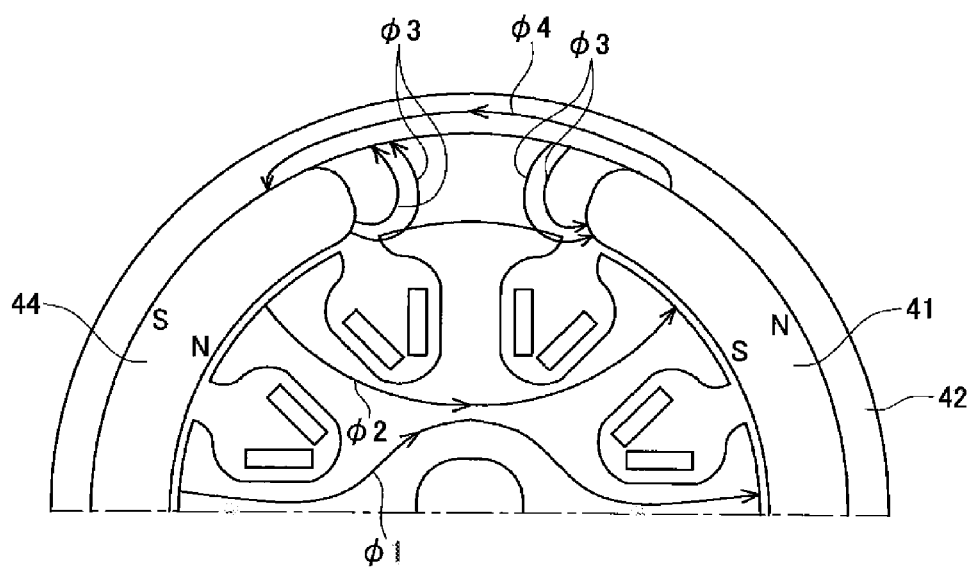
FIG. 7 is a diagram for explaining a flow of a magnetic flux of the motor section of the fuel pump according to the first comparative embodiment.

Now, in order to facilitate better understanding of the advantages achieved by the motor section 40 of the fuel pump 10 according to the first embodiment, operations and effects of motor sections of several comparative embodiment will now be described. In a first comparative embodiment shown in FIGS. 6 and 7, a magnetic material piece is not disposed between magnets 41 and 44. As shown in FIG. 7, in a motor section according to the first comparative embodiment, a magnetic flux φ3 emitted from an end of the magnet 44 flows to a housing 42 via a core (yoke) 49. In addition, the magnetic flux φ3 emitted from the housing 42 flows to an end of the magnet 41 via the core (yoke) 49. In other words, the magnetic flux φ3 becomes a diamagnetic flux and is not utilized as an effective magnetic flux. Consequently, an output of the motor section 40 declines. Furthermore, since the magnetic distribution of the motor section 40 changes abruptly in a circumferential direction, an increase in a cogging torque occurs.

Figure 8:
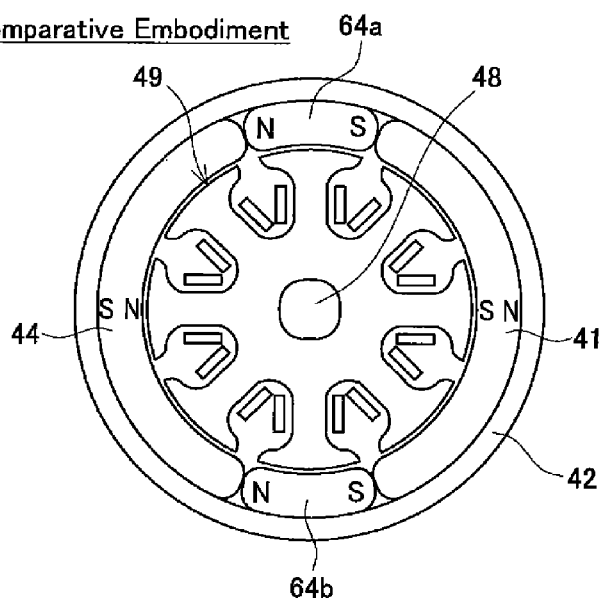
FIG. 8 is a cross-sectional view of a motor section of a fuel pump according to a second comparative embodiment (a cross section corresponding to II-II in FIG. 1).
Figure 9:
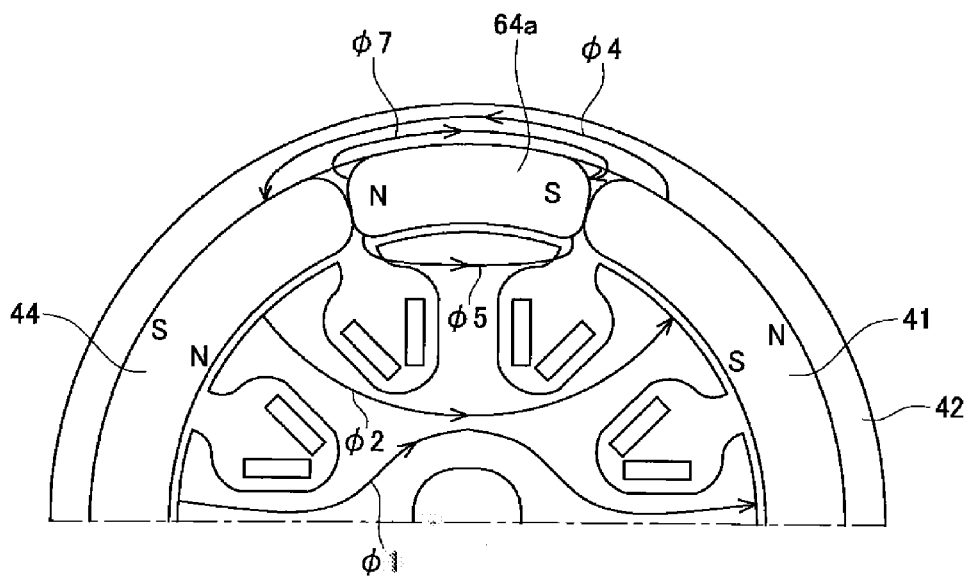
FIG. 9 is a diagram for explaining a flow of a magnetic flux of the motor section of the fuel pump according to the second comparative embodiment.

In addition, in a second comparative embodiment shown in FIGS. 8 and 9, magnets 64a and 64b are disposed between magnets 41 and 44. Ends of the magnets 64a and 64b on the side of the magnet 44 are arranged as north poles and the ends on the side of the magnet 41 are arranged as south poles. As shown in FIG. 9, in the second comparative embodiment, by disposing the magnets 64a and 64b between the magnets 41 and 44, magnetic fluxes emitted from the ends of the magnets 41 and 44 are prevented from becoming diamagnetic fluxes. However, a magnetic flux φ4 emitted from the north pole of the magnet 41 and a magnetic flux φ7 emitted from the north pole of the magnet 64a flow through the housing 42. As a result, the housing 42 becomes magnetically saturated and an output of a motor section 40 cannot be increased. Moreover, in the second comparative embodiment, since a fuel flow channel of the motor section 40 is blocked by the magnets 64a and 64b, pressure drop increases when fuel flows through the motor section 40. In addition, polarities (north poles, south poles) of the magnets 41 and 44 are oriented in a radial direction while polarities (north poles, south poles) of the magnets 64a and 64b are oriented in a circumferential direction. Therefore, a manufacturing method in which the magnets 41, 44, 64a and 64b are magnetized after assembling the magnets on the housing 42 cannot be adopted.

Figure 10:
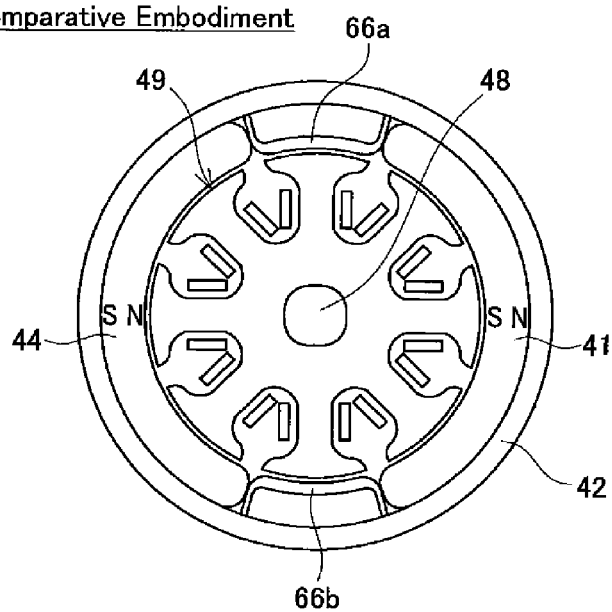
FIG. 10 is a cross-sectional view of a motor section of a fuel pump according to a third comparative embodiment (a cross section corresponding to II-II in FIG. 1).
Figure 11:
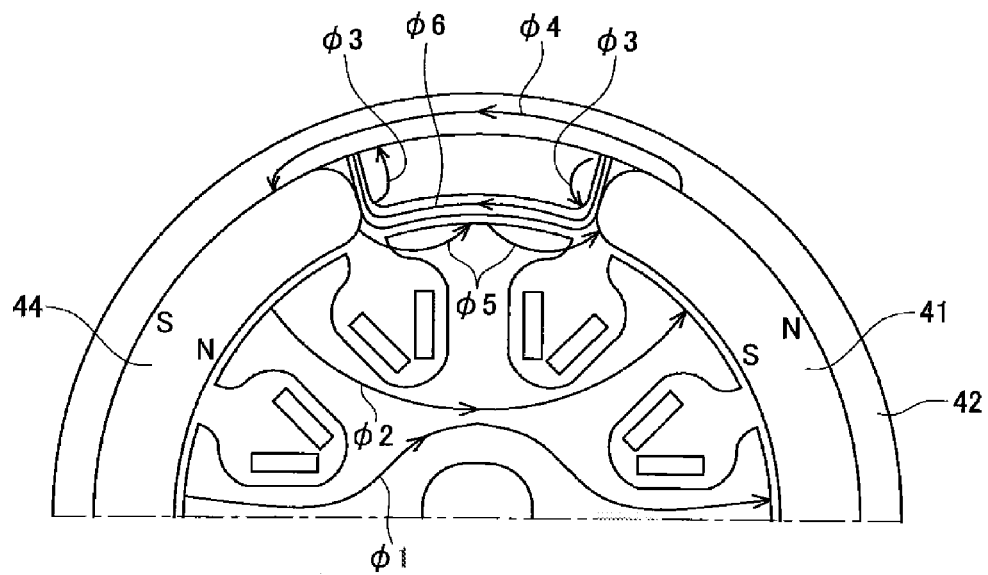
FIG. 11 is a diagram for explaining a flow of a magnetic flux of the motor section of the fuel pump according to the third comparative embodiment.

Furthermore, in a third comparative embodiment shown in FIGS. 10 and 11, inner circumferential surfaces of central portions of magnetic material pieces 66a and 66b disposed between magnets 41 and 44 are consistent with extended surfaces of inner circumferential surfaces of the magnets 41 and 44. As shown in FIG. 11, in the third comparative embodiment, since a distance between the magnetic material piece 66a and a core (yoke) 49 of a rotor 46 is short, a magnetic flux φ5 flowing from an end of the magnet 44 to the core (yoke) 49 flows to the magnetic material piece 66a and a magnetic flux φ5 flowing from the magnetic material piece 66a to the core (yoke) 49 flows to an end of the magnet 41. As a result, the magnetic fluxes from the ends of the magnets 41 and 44 are not utilized as effective magnetic fluxes and an output of a motor section 40 cannot be improved.

Figure 12:
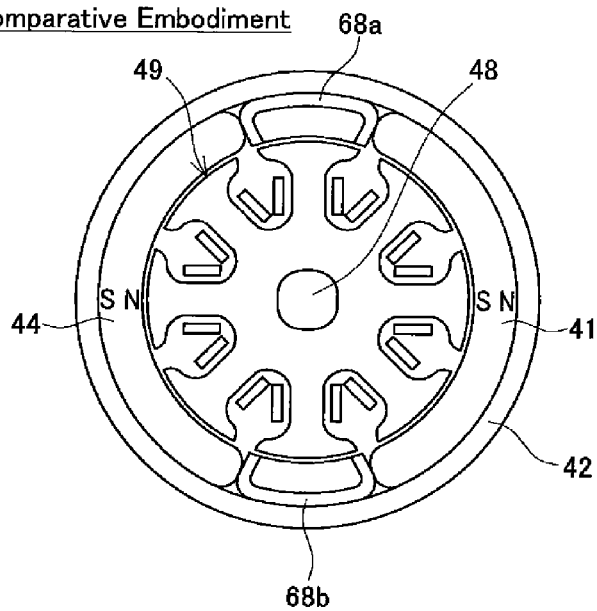
FIG. 12 is a cross-sectional view of a motor section of a fuel pump according to a fourth comparative embodiment (a cross section corresponding to II-II in FIG. 1).
Figure 13:
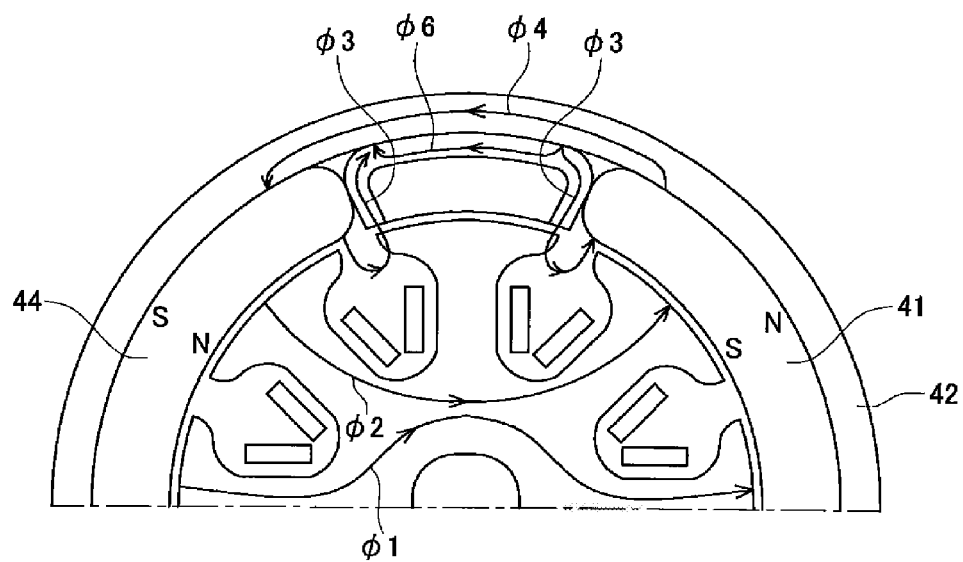
FIG. 13 is a diagram for explaining a flow of a magnetic flux of the motor section of the fuel pump according to the fourth comparative embodiment.

Moreover, in a fourth comparative embodiment shown in FIGS. 12 and 13, while magnetic material pieces 68a and 68b are disposed between magnets 41 and 44, directions of installation of the magnetic material pieces 68a and 68b differ from the first embodiment. In other words, central portions of the magnetic material pieces 68a and 68b are brought into contact with a housing 42, and both end surfaces of the magnetic material pieces 68a and 68b are positioned on surfaces that are extensions of inner circumferential surfaces of the magnets 41 and 44. As illustrated in FIG. 13, in the fourth comparative embodiment, a magnetic flux φ3 emitted from an end of the magnet 44 becomes a diamagnetic flux and is not utilized as an effective magnetic flux. Consequently, an output of a motor section 40 cannot be increased.

Figure 18:
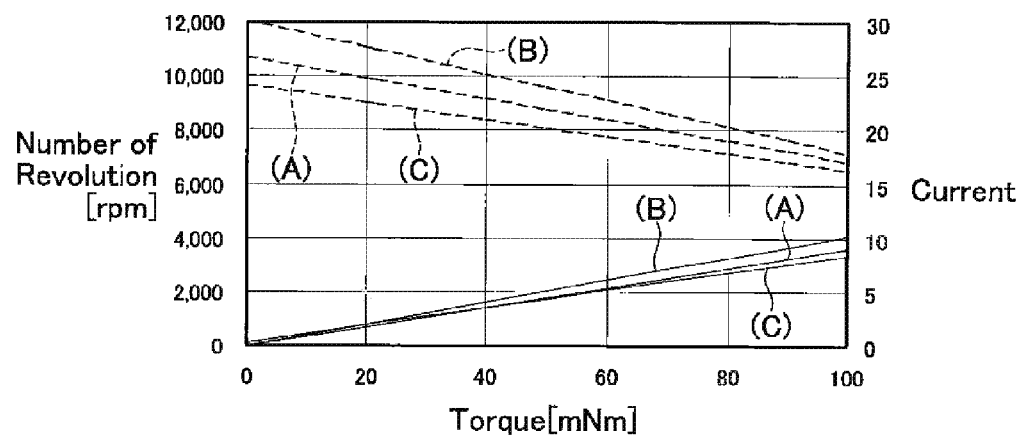
FIG. 18 is a graph illustrating a relationship between torque, number of revolutions, and current (of the first embodiment and the first and second comparative embodiments).
Figure 19:
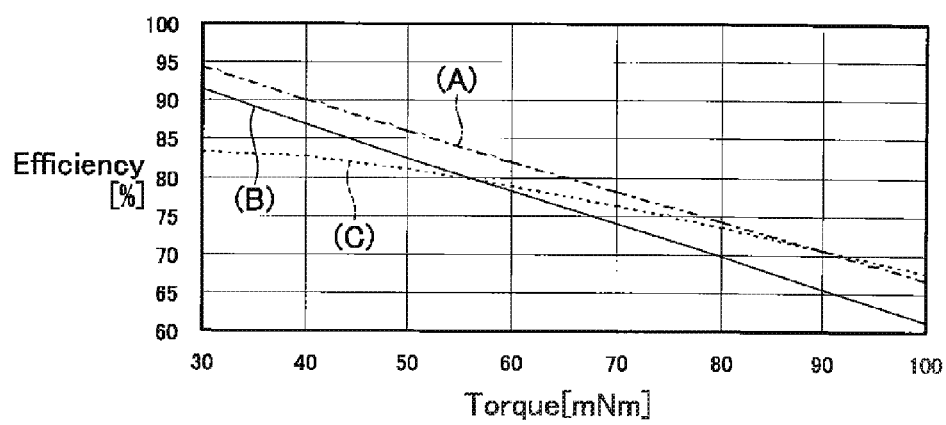
FIG. 19 is a graph illustrating a relationship between torque and efficiency (of the first embodiment and the first and second comparative embodiments).

FIG. 18 illustrates results of calculations of a relationship of "torque—number of revolutions" and a relationship of "torque—current value" respectively performed for the first embodiment and the first and second comparative embodiments described above. In the drawing, dotted lines represent "torque—number of revolutions" relationships and solid lines represent "torque—current value" relationships. FIG. 19 illustrates results of calculations of a relationship of "torque—efficiency" respectively performed using the calculation results illustrated in FIG. 18 for the first embodiment and the first and second comparative embodiments. The lines (A) of FIGS. 18 and 19 show the results of calculations performed for the first embodiment. The lines (B) of FIGS. 18 and 19 show the results of calculations performed for the first comparative embodiment. The lines (C) of FIGS. 18 and 19 show the results of calculations performed for the second comparative embodiment. As is apparent from FIG. 19, the fuel pump 10 according to the first embodiment has a higher efficiency than the fuel pumps according to the first and second comparative embodiments in a torque range (30 to 80 N·m) that is used by a fuel pump for a vehicle.

Figure 20:
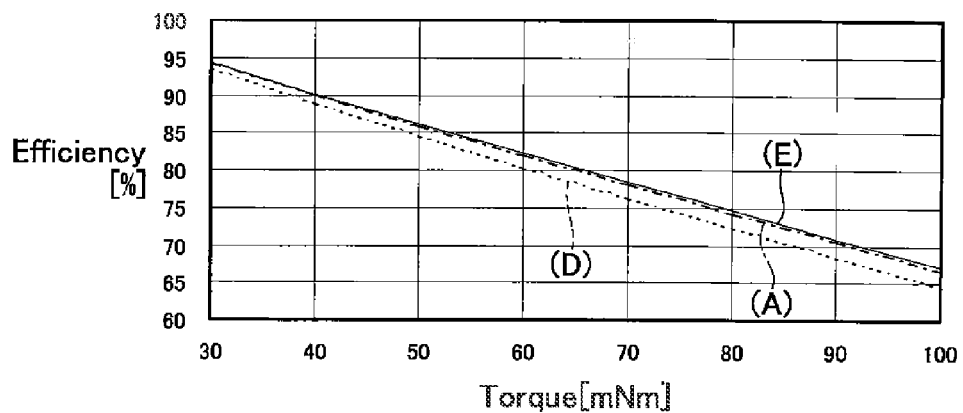
FIG. 20 is a graph illustrating a relationship between torque and efficiency (of the first embodiment, the first modified embodiment and the third comparative embodiment).

In addition, FIG. 20 illustrates results of calculations of a relationship of "torque—efficiency" respectively performed for the first embodiment, the first modified embodiment, and the third comparative embodiment. The line (A) of FIG. 20 shows the result of calculation performed for the first embodiment. The line (E) of FIG. 20 shows the result of calculation performed for the first modified embodiment. The line (D) of FIG. 20 shows the result of calculation performed for the third comparative embodiment. As shown in FIG. 20, approximately the same efficiency is obtained by the first embodiment and the first modified embodiment, and the first embodiment and the first modified embodiment have higher efficiencies than the third comparative embodiment.

As is apparent from the above description, in the fuel pump 10 according to the present embodiment, the magnetic material pieces 56a and 56b are disposed between the magnets 41 and 44. Therefore, a cogging torque generated at the motor section 40 can be reduced.

In addition, in the fuel pump 10 according to the present embodiment, large gaps are formed between the magnetic material pieces 56a and 56b and the core (yoke) 49 as compared to conventional art (i.e., the third comparative embodiment). Therefore, an effective magnetic flux flowing through the core (yoke) 49 of the rotor 46 increases, enabling the output of the motor section 40 to be increased. Furthermore, since spaces are formed between the magnetic material pieces 56a and 56b and the core 49 and between the magnetic material pieces 56a and 56b and the housing 42, sufficient fuel flow channels to the motor section 40 can be formed. Therefore, a pressure drop when fuel flows through the motor section 40 can be reduced. Accordingly, a pump efficiency of the fuel pump 10 can be improved.

Moreover, the fuel pump 10 according to the present embodiment merely requires that the magnetic material pieces 56a and 56b be disposed between the magnets 41 and 44. Therefore, unmagnetized magnets 41 and 44 can be assembled onto the housing 42 to be magnetized afterwards. Therefore, the fuel pump 10 can be readily manufactured.

Figure 14:
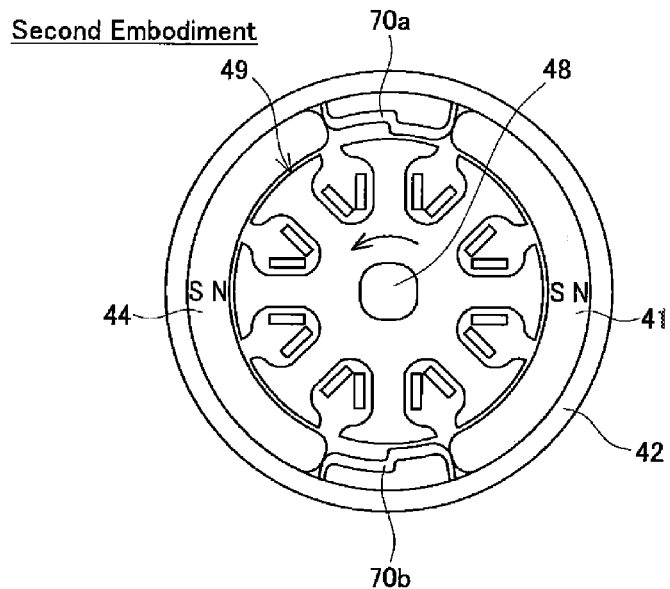
FIG. 14 is a cross-sectional view of a motor section of a fuel pump according to a second embodiment (a cross section corresponding to II-II in FIG. 1).

While gaps between the magnetic material pieces 56a and 56b and the core 49 are arranged so as to be approximately constant in the circumferential direction in the first embodiment, the technique according to the present teachings is not limited to such an embodiment. For example, as is the case with a second embodiment illustrated in FIGS. 14 and 15, magnetic material pieces 70a and 70b may be adopted which do not provide gaps between a core 49 that are constant in a circumferential direction. The magnetic material pieces 70a and 70b are arranged such that gaps between the core (yoke) 49 is greater on the side of a magnet 44 (i.e., a magnet whose inner circumferential surface becomes a north pole) and smaller on the side of a magnet 41 (i.e., a magnet whose inner circumferential surface becomes a south pole). More specifically, inner circumferential surface of the magnetic material pieces 70a and 70b are positioned, on the side of the magnet 41, on a circumferential surface that is an extension of the inner circumferential surface of the magnet 41.

Figure 15:
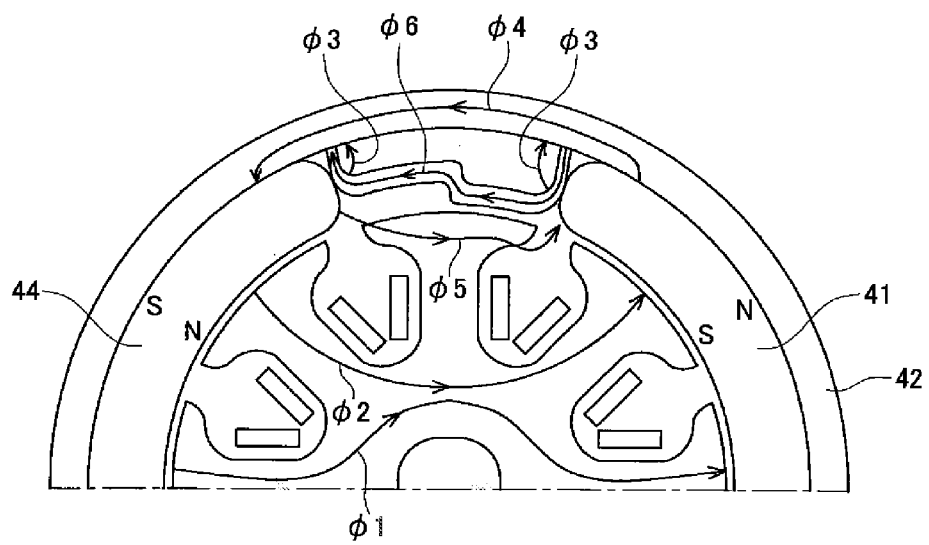
FIG. 15 is a diagram for explaining a flow of a magnetic flux of the motor section of the fuel pump according to the second embodiment.

As illustrated in FIG. 15, even with a fuel pump according to the second embodiment, a magnetic flux $\phi5$ emitted from an end of the magnet 44 flows through the core (yoke) 49 to the inner circumferential surface (i.e., a south pole-side surface) of the magnet 41. In addition, a part $\phi6$ of the magnetic flux emitted from the outer circumferential surface (i.e., north pole-side surface) of the magnet 41 flows through the magnetic material piece 70a from the side of the magnet 41 to the side of the magnet 44. Consequently, an output of a motor section 40 can be improved while reducing a cogging torque.

Figure 16:
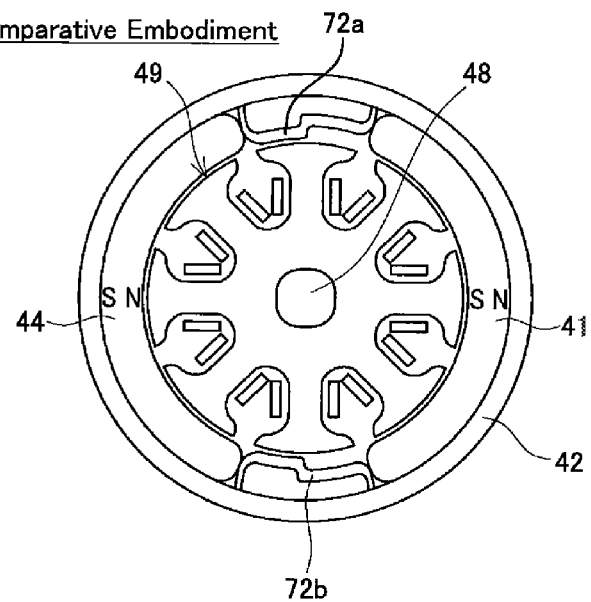
FIG. 16 is a cross-sectional view of a motor section of a fuel pump according to a fifth comparative embodiment (a cross section corresponding to II-II in FIG. 1).
Figure 17:
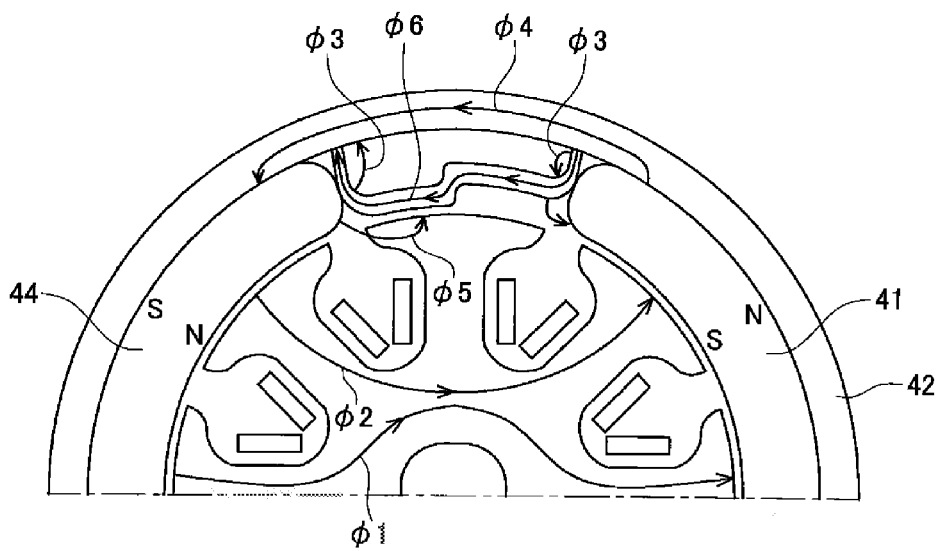
FIG. 17 is a diagram for explaining a flow of a magnetic flux of the motor section of the fuel pump according to the fifth comparative embodiment.

Moreover, in a case such as the fifth comparative embodiment illustrated in FIGS. 16 and 17 in which the inner circumferential surfaces of the magnetic material pieces 72a and 72b are positioned, on the side of a magnet 44, on the circumferential surface that is the extension of the inner circumferential surface of the magnet 44, and on the side of the magnet 41, shifted towards the housing 42 from the circumferential surface that is an extension of the inner circumferential surface of the magnet 44, motor efficiency cannot be improved as compared to the second embodiment. In other words, as shown in FIG. 17, since the distance between the magnetic material piece 72a and a core 49 is short on the side of the magnet 44, the magnetic flux $\phi5$ flowing from the end of the magnet 44 to the core 49 inadvertently flows to the magnetic material piece 72a. As a result, the magnetic flux $\phi5$ is not utilized as the effective magnetic flux and the output of the motor section cannot be improved.

Figure 21:
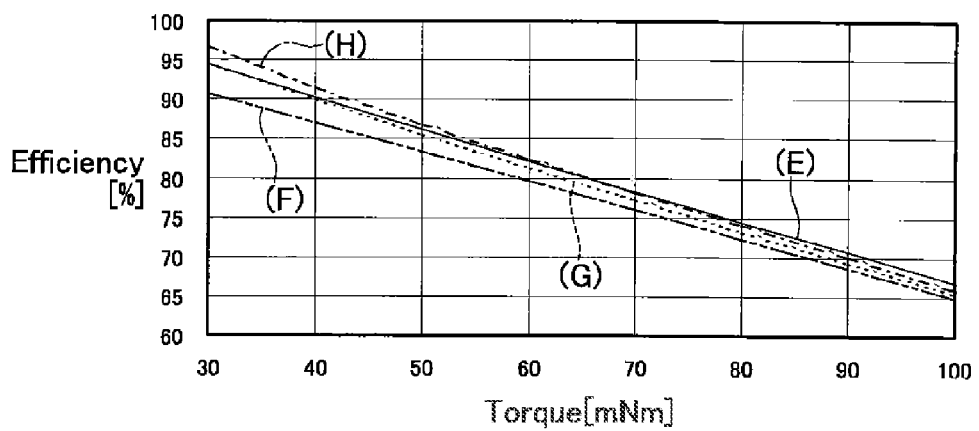
FIG. 21 is a graph illustrating a relationship between torque and efficiency (of the second embodiment, the first modified embodiment and the fourth and fifth comparative embodiments).

FIG. 21 illustrates results of calculations of the relationship of "torque—efficiency" respectively performed for the second embodiment, the first modified embodiment, and the fourth and fifth comparative embodiments. The line (H) of FIG. 21 shows the result of the calculation performed for the second embodiment. The line (E) of FIG. 21 shows the result of the calculation performed for the first modified embodiment. The line (G) of FIG. 21 shows the result of the calculation performed for the fourth comparative embodiment. The line (F) of FIG. 21 shows the result of the calculation performed for the fifth comparative embodiment. As shown in FIG. 21, approximately the same efficiency is obtained by the second embodiment and the first modified embodiment, and the second embodiment has a higher efficiency than the fourth and fifth comparative embodiments.

While the motor sections of a type in which the magnet (i.e., permanent magnet) is attached on the stator side (i.e., side of the housing 42) have been used in the respective embodiments described above, the technique according to the present teachings can also be applied to a motor section of a type where the magnet (i.e., permanent magnet) is attached on the rotor side.

Figure 22:
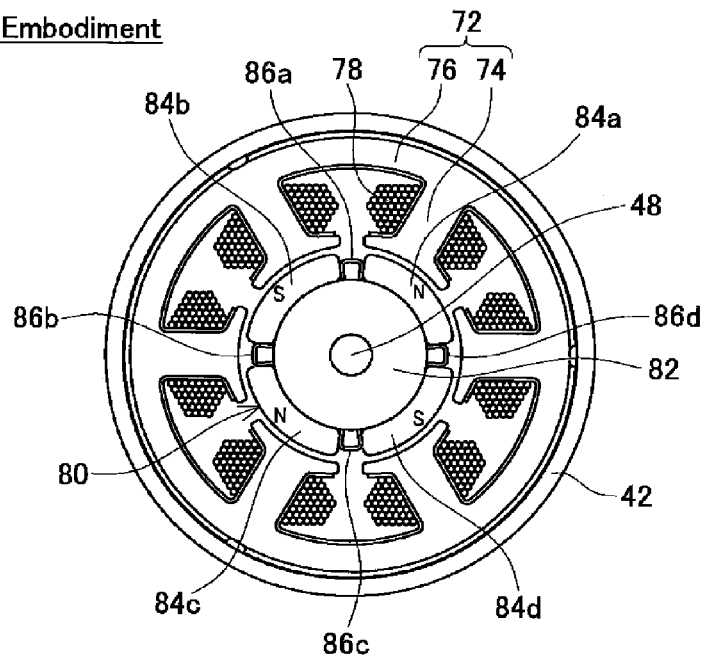
FIG. 22 is a cross-sectional view of a motor section of a fuel pump according to a third embodiment (a cross section corresponding to II-II in FIG. 1).
Figure 23:
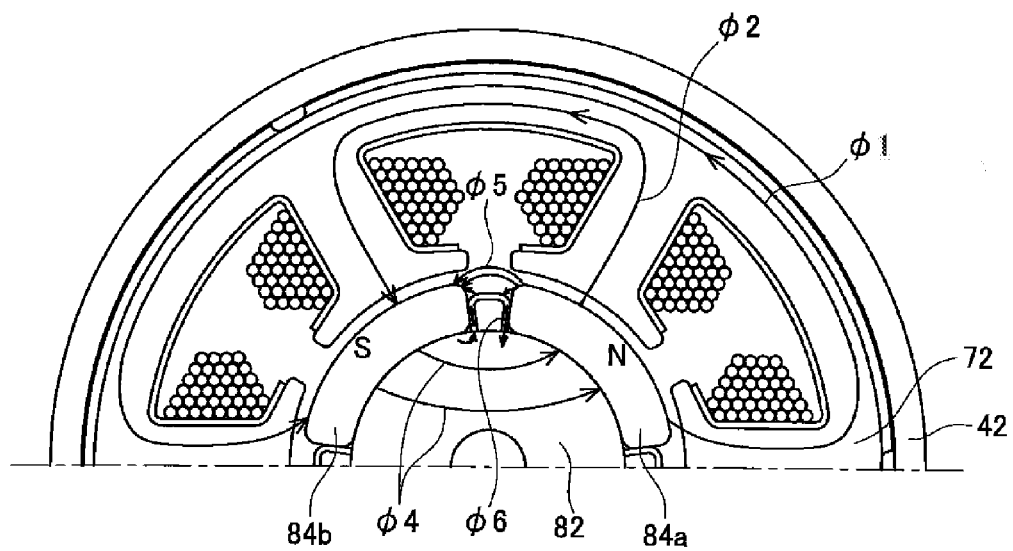
FIG. 23 is a diagram for explaining a flow of a magnetic flux of the motor section of the fuel pump according to the third embodiment.

For example, as is the case with a third embodiment illustrated in FIGS. 22 and 23, magnets 84a to 84d may be disposed on the side of a rotor 80 and a coil 78 may be wound around a slot 74 on the side of a housing 42. In other words, the rotor 80 has a yoke 82 fixed to a shaft 48, magnets 84a to 84d fixed to an outer circumferential surface of the yoke 82, and magnetic material pieces 86a to 86d disposed between adjacent magnets. The magnets 84a and 84c are magnetized so that outer circumferential surface-sides thereof become north poles and inner circumferential surface-sides thereof become south poles. The magnets 84b and 84d are magnetized so that outer circumferential surface-sides thereof become south poles and inner circumferential surface-sides thereof become north poles. The outer circumferential surfaces of the magnets 84a to 84d are positioned on a same circumferential surface whose center is the center of the shaft 48. The magnetic material pieces 86a to 86d are made of a plate member of a magnetic material (e.g., iron). The magnetic material pieces 86a to 86d abut adjacent magnets and also abut the yoke 82. The outer circumferential surfaces of the magnetic material pieces 86a to 86d are shifted towards the shaft 48 from circumferential surfaces that are extensions of the outer circumferential surfaces of the magnets 84a to 84d. Moreover, the magnets 84a to 84d and the magnetic material pieces 86a to 86d extend in an axis direction of the shaft 48 and face the slot 74 across all axial areas in which the slot 74 is formed.

A stator-side yoke 72 is fixed to an inner wall surface of the housing 42. The yoke 72 has a ring portion 76 fixed to the housing 42 and a plurality of slots 74 formed on an inner circumferential side of the ring portion 76. The plurality of slots 74 is disposed at an interval in the circumferential direction. Front end surfaces (i.e., inner circumferential surfaces) of the plurality of slots 74 are positioned on a same circumferential surface whose center is the center of the shaft 48, and face the outer circumferential surfaces of the magnets 84a to 84d with small gaps in between. A coil 78 is wound around each slot 74 (i.e., the coil 78 is wound by so-called concentrated winding).

In the motor section described above, as shown in FIG. 23, a magnetic flux $\phi4$ emitted from the inner circumferential surface (i.e., north pole-side) of the magnet 84b flows through the yoke 82 to the inner circumferential surface (i.e., south pole-side) of the magnet 84a. Magnetic fluxes $\phi1$ and $\phi2$ emitted from the outer circumferential surface (i.e., north pole-side) of the magnet 84a flows through the stator-side yoke 72 to the outer circumferential surface (i.e., south pole-side) of the magnet 84b. In addition, since the magnetic material piece 86a has been shifted towards the shaft 48 (i.e., a greater gap is formed between the outer circumferential surface of the magnetic material piece 86a and the inner circumferential surfaces of the slots 74), a magnetic flux $\phi5$ emitted from an end of the magnet 84a is first projected to the side of the yoke 72 and next flows to the magnet 84b. Therefore, the magnetic flux $\phi5$ emitted from the end of the magnet 84a is utilized as an effective magnetic flux. On the other hand, a magnetic flux $\phi6$ emitted from an end of the magnet 84b flows through the magnetic material piece 86a toward the magnet 84a. Therefore, a magnetic distribution in a circumferential direction becomes gradual and a cogging torque is reduced.

Figure 24:
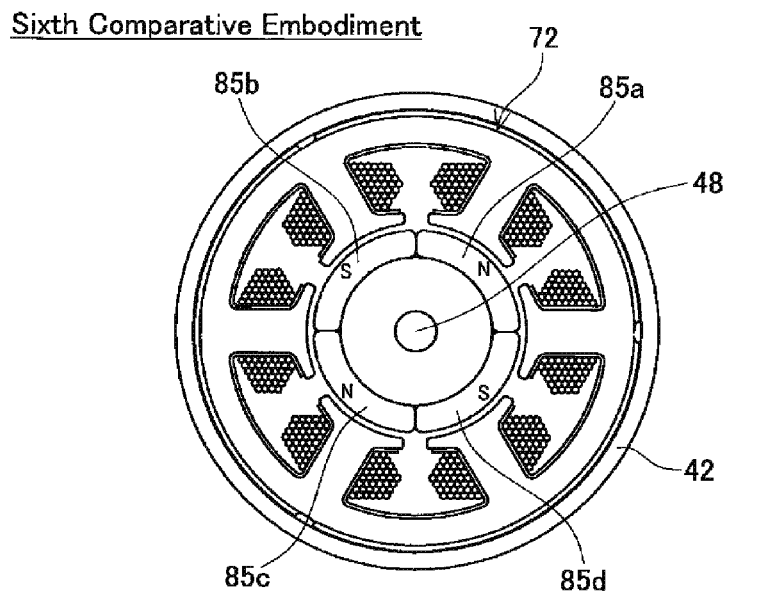
FIG. 24 is a cross-sectional view of a motor section of a fuel pump according to a sixth comparative embodiment (a cross section corresponding to II-II in FIG. 1).
Figure 25:
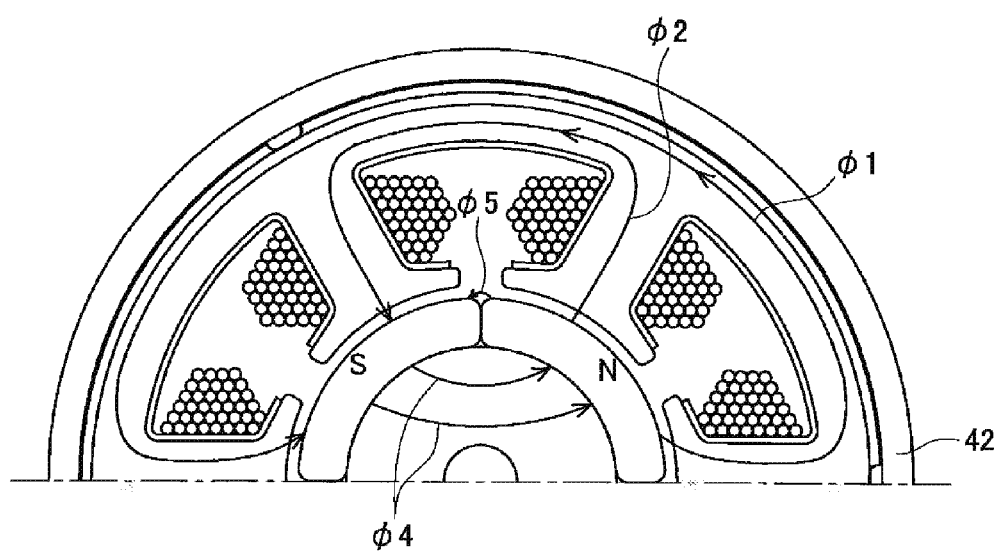
FIG. 25 is a diagram for explaining a flow of a magnetic flux of the motor section of the fuel pump according to the sixth comparative embodiment.

Meanwhile, in a case such as a sixth comparative embodiment illustrated in FIGS. 24 and 25 in which end surfaces of magnets 85a to 85d are abutted, the motor efficiency cannot be improved as compared to the third embodiment. In other words, as shown in FIG. 25, a magnetic flux $\phi5$ emitted from an end of the magnet 85a linearly flows to the end of the magnet 85b and does not flow so as to be projected toward the stator-side yoke 72. Therefore, the magnetic flux $\phi5$ emitted from the end of the magnet 85a is not utilized as an effective magnetic flux and an output of the motor section cannot be improved.

Figure 26:
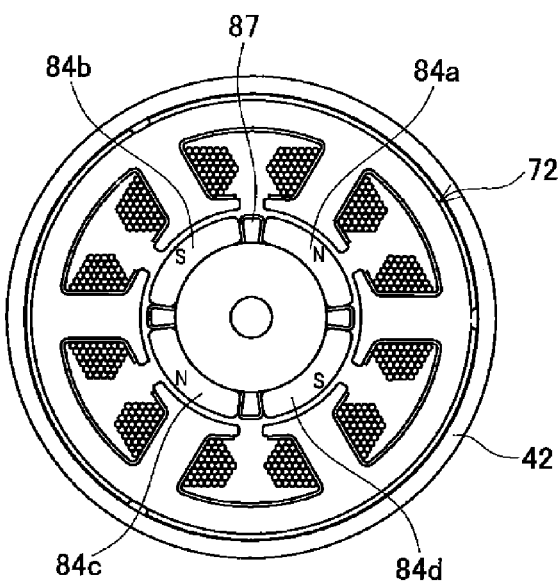
FIG. 26 is a cross-sectional view of a motor section of a fuel pump according to a seventh comparative embodiment (a cross section corresponding to II-II in FIG. 1).
Figure 27:
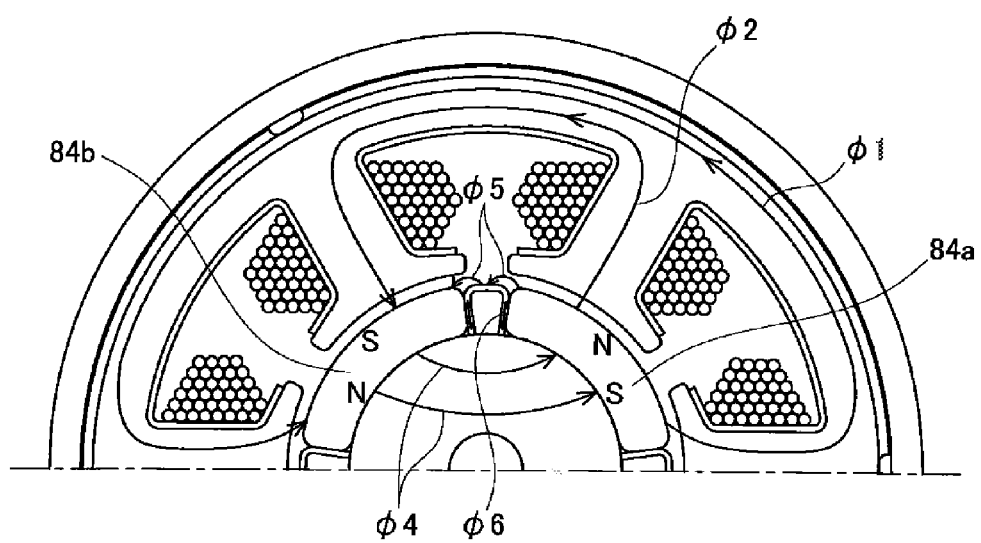
FIG. 27 is a diagram for explaining a flow of a magnetic flux of the motor section of the fuel pump according to the seventh comparative embodiment.

In addition, as is the case of a seventh comparative embodiment illustrated in FIGS. 26 and 27, when outer circumferential surfaces of magnetic material pieces 87 to be disposed between ends of magnets 84a to 84d are positioned on extension surfaces of outer circumferential surfaces of the magnets 84a to 84d, motor efficiency cannot be improved as compared to the third embodiment. That is, as shown in FIG. 27, a magnetic flux $\phi5$ emitted from an end of the magnet 84a inadvertently flows to the magnetic material pieces 87 and is not utilized as an effective magnetic flux.

As is apparent from the above description, with the fuel pump according to the third embodiment also, by shifting the magnetic material pieces 86a to 86d toward the shaft 48, an output of the motor section can be increased while reducing a cogging torque.

Figure 28:
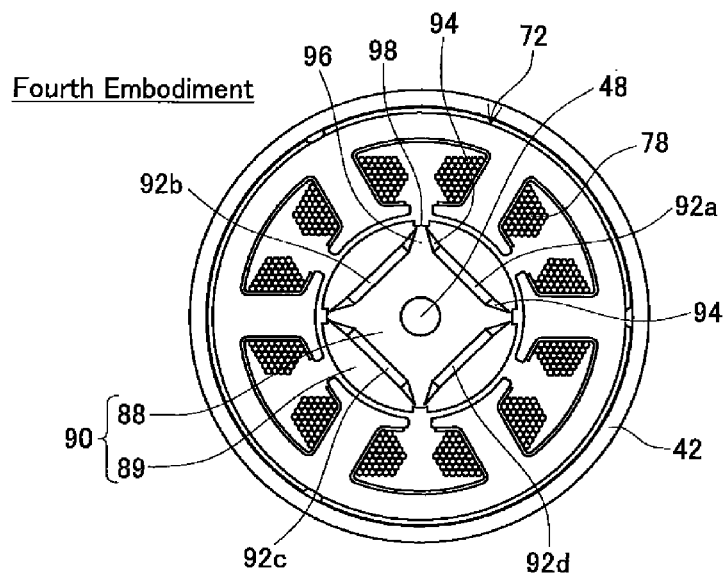
FIG. 28 is a cross-sectional view of a motor section of a fuel pump according to a fourth embodiment (a cross section corresponding to II-II in FIG. 1).
Figure 29:
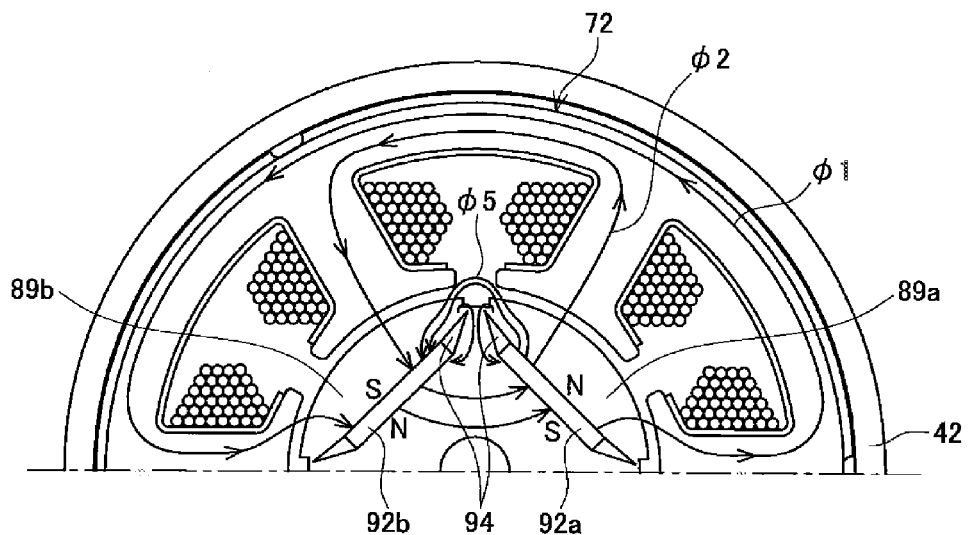
FIG. 29 is a diagram for explaining a flow of a magnetic flux of the motor section of the fuel pump according to the fourth embodiment.

Moreover, in a case using a motor section of a type in which a magnet (i.e., permanent magnet) is attached to a rotor side, a configuration according to a fourth embodiment illustrated in FIGS. 28 and 29 can be adopted. As is apparent from FIG. 28, a configuration on the side of a stator (i.e., a housing 42, a yoke 72, and a coil 78) of the fourth embodiment is the same as the stator-side configuration of the third embodiment, and only the rotor-side configuration differs. A rotor according to the fourth embodiment has a yoke 90 fixed to a shaft 48 and magnets 92a to 92d embedded in the yoke 90. The magnets 92a and 92c are magnetized so that outside surfaces thereof become north poles and inside surfaces thereof become south poles. On the other hand, the magnets 92b and 92d are magnetized so that outside surfaces thereof become south poles and inside surfaces thereof become north poles.

The yoke 90 comprises a third yoke portion 89 positioned outside of the magnets 92a to 92d and a second yoke portion 88 positioned inside of the magnets 92a to 92d. The third yoke portion 89 and the second yoke portion 88 are magnetically separated from each other by a space 94 formed inside the yoke 90. Moreover, the third yoke portion 89 and the second yoke portion 88 can be coupled to each other outside of the space 94. Accordingly, the magnets 92a to 92d can be stably retained between the third yoke portion 89 and the second yoke portion 88. In this case, a coupling width of the third yoke portion 89 and the second yoke portion 88 is set extremely small and magnetic separation between the third yoke portion 89 and the second yoke portion 88 is secured. An outer circumferential surface of the third yoke portion 89 is positioned on a same circumferential surface whose center is the center of the shaft 48. In the fourth embodiment, the permanent magnet part as referred to in the claims comprises the magnets 92a to 92d and the third yoke portion 89. A corner 96 of the second yoke portion 88 is disposed between an adjacent permanent magnet part (comprising the magnet 92 and the third yoke portion 89). The corner 96 is sandwiched by the space 94 that separates the third yoke portion 89 from the second yoke portion 88. An outer circumferential surface of the corner 96 is shifted towards the shaft 48 from a circumferential surface that is an extension of the outer circumferential surface of the third yoke portion 89.

In the motor section described above, as shown in FIG. 29, a magnetic flux $\phi 5$ emitted from the outside surface (i.e., north pole-side) of the magnet 92a flows so as to be first projected from the third yoke portion 89a toward the stator-side yoke 72 and next flows to the third yoke portion 89b. Consequently, the magnetic flux $\phi 5$ is utilized as the effective magnetic flux and the output of the motor section can be improved.

Figure 30:
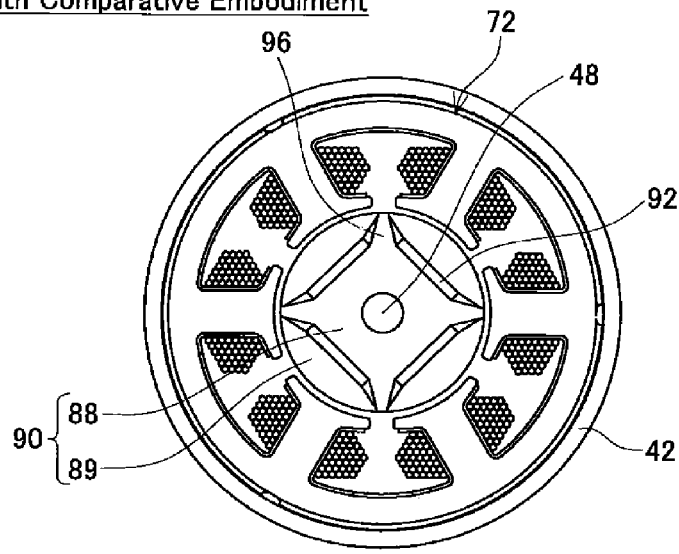
FIG. 30 is a cross-sectional view of a motor section of a fuel pump according to an eighth comparative embodiment (a cross section corresponding to II-II in FIG. 1).
Figure 31:
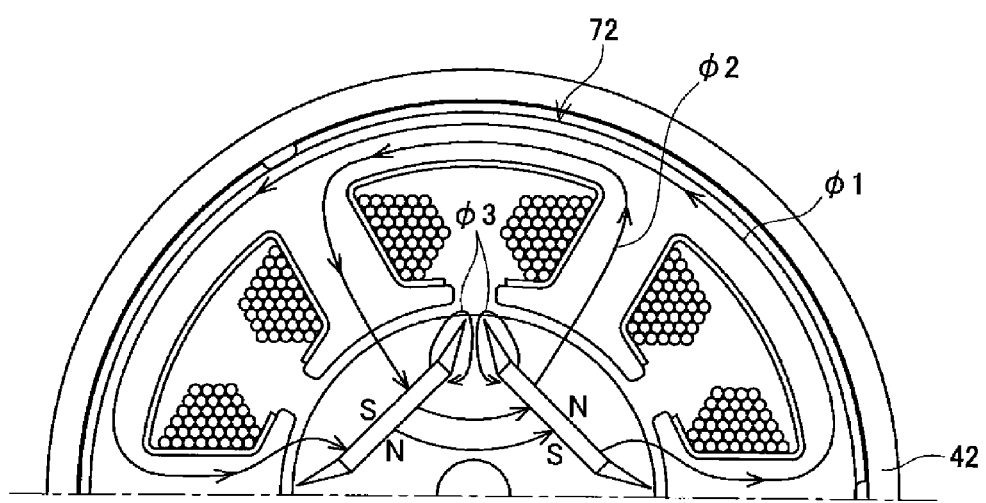
FIG. 31 is a diagram for explaining a flow of a magnetic flux of the motor section of the fuel pump according to the eighth comparative embodiment.

On the other hand, in an eighth comparative embodiment illustrated in FIGS. 30 and 31, an outer circumferential surface of a corner of a second yoke portion 88 is consistent with a circumferential surface that is an extension of an outer circumferential surface of a third yoke portion 89. In this case, as shown in FIG. 31, a magnetic flux $\phi 3$ emitted from an end of a magnet 92a flows from the third yoke portion 89 to the corner of the second yoke portion 88 and does not flow so as to be projected toward a stator-side yoke 72. Therefore, the magnetic flux $\phi 3$ emitted from the end of the magnet 92a is not utilized as an effective magnetic flux and an output of the motor section cannot be improved.

As is apparent from the above description, even with the fuel pump according to the fourth embodiment, by shifting the corner of the second yoke portion 88 disposed between adjacent permanent magnet parts toward a shaft 48, an output of the motor section can be increased.

Finally, although the preferred representative embodiments have been described in detail, the present embodiments are for illustrative purpose only and not restrictive. It is to be understood that various changes and modifications may be made without departing from the spirit or scope of the appended claims. In addition, the additional features and aspects disclosed herein also may be utilized singularly or in combination with the above aspects and features.

What is claimed is:

1. A fuel pump comprising:
a motor section; and
a pump section driven by the motor section, wherein
the motor section comprises a rotor and a stator facing the rotor,
the stator comprises at least two permanent magnet parts at least two magnetic material parts, and a housing, each of the permanent magnet parts being disposed along a first circumferential surface at an interval in a circumferential direction, each of the magnetic material parts being disposed between adjacent permanent magnet parts and making contact with the housing, the permanent magnet parts comprising a first permanent magnet part and a second permanent magnet part that composes a pair, a polarity of an inner surface of the first permanent magnet part being a north pole, and a polarity of an inner surface of the second permanent magnet part being a south pole, the housing being fixed to the outer surface of the permanent magnet part,
the rotor comprises a first yoke facing the permanent magnet parts, the first yoke having a plurality of slots disposed along a second circumferential surface at an interval in the circumferential direction, the second circumferential surface being coaxial to the first circumferential surface,
each of the inner surfaces of the permanent magnet parts is disposed on the first circumferential surface,
each of the outer surfaces of the slots is disposed on the second circumferential surface, and faces the inner surface of the permanent magnet part,
each of the magnetic material parts has an inner surface facing the outer surfaces of the slots, the inner facing surface including a region shifted from the first circumferential surface toward a radially outer side, at least a part of the shifted region in an axial direction being positioned in a range where the slots face the permanent magnet parts, and the shifted region in the circumferential direction being an arcuate surface and formed in an area including at least a first permanent magnet part side end of each magnetic material part, and
a distance from the first circumferential surface to the shifted region is constant.

2. The fuel pump as in claim 1, wherein each of the shifted regions of the magnetic material parts is formed in an entire circumferential area from the first permanent magnet part side end of each magnetic material part to a second permanent magnet part side end of each magnetic material part.

3. The fuel pump as in claim 2, wherein:
each of the magnetic material parts is a plate member, one end of the plate member making contact with the adjacent first permanent magnet part, and another end of the plate member making contact with the adjacent second permanent magnet part, a first gap between the plate member and the housing is provided in at least a part of the plate member in the circumferential direction, and a second gap between the plate member and the first circumferential surface is provided in at least a part of the plate member in the circumferential direction.

4. The fuel pump as in claim 3, wherein:

each of the magnetic material parts comprises two end portions extending from the housing toward the rotor and a central portion extending in the circumferential direction, one end of the central portion is connected to the one of the end portions, and another end of the central portion is connected to the other of the end portions, one of the end portions makes contact with the first permanent magnet part, and another of the end portions makes contact with the second permanent magnet part, and the central portion comprises the facing surface including the shifted region.

5. The fuel pump as in claim 4, wherein the pump section comprises a casing and an impeller disposed within the casing, and the motor section drives the impeller.

6. The fuel pump as in claim 2, wherein:

the stator further comprises a housing fixed to outer surfaces of the permanent magnet parts, each of the magnetic material parts is a plate member, and comprises two end portions extending from the housing toward the rotor and a central portion extending in the circumferential direction, one end of the central portion is connected to the one of the end portions, and another end of the central portion is connected to the other of the end portions, each of the end portions is not in contact with either of the permanent magnet parts, and is in contact with the housing, and the central portion comprises the facing surface including the shifted region.

7. The fuel pump as in claim 6, wherein:

a first gap between the central portion and the housing is provided in at least a part of the central portion in the circumferential direction, and a second gap between the central portion and the first circumferential surface is provided in at least a part of the central portion in the circumferential direction.

8. The fuel pump as in claim 1, wherein a distance from the first circumferential surface to the first permanent magnet part side end of the facing surface is shorter than a distance from the first circumferential surface to the second permanent magnet part side end of the facing surface.

9. The fuel pump as in claim 8, wherein:

the stator further comprises a housing fixed to outer surfaces of the permanent magnet parts, each of the magnetic material parts is a plate member, one end of the plate member making contact with the adjacent first permanent magnet part, and another end of the plate member making contact with the adjacent second permanent magnet part, a first gap between the plate member and the housing is provided in at least a part of the plate member in the circumferential direction, and a second gap between the plate member and the first circumferential surface is provided in at least a part of the plate member in the circumferential direction.

10. A fuel pump comprising:

a motor section; and a pump section driven by the motor section, wherein the motor section comprises a rotor and a stator facing the rotor, the stator comprises at least two permanent magnet parts, magnetic material parts, and a housing, each of the permanent magnet parts being disposed along a first circumferential surface at an interval in a circumferential direction, each of the magnetic material parts being disposed between the adjacent permanent magnet parts and making contact with the housing, a pair of permanent magnet parts comprising a first permanent magnet part and a second permanent magnet part, a polarity of an inner surface of the first permanent magnet part being a North pole, and a polarity of an inner surface of the second permanent magnet part being a South pole, the housing being fixed to the outer surface of the permanent magnet part, the rotor comprises a first yoke facing the permanent magnet parts, the first yoke having a plurality of slots disposed along a second circumferential surface at an interval in the circumferential direction, the second circumferential surface being coaxial to the first circumferential surface, each of the inner surfaces of the permanent magnet parts is disposed on the first circumferential surface, each of the outer surfaces of the slots is disposed on the second circumferential surface, and faces the inner surface of the permanent magnet part, each of the magnetic material parts has an inner surface facing the outer surfaces of the slots, the inner facing surface including a region shifted from the first circumferential surface to the outer side, at least a part of the shifted region being positioned in an axial range where the slots face the permanent magnet parts, and the shifted region being formed in an circumferential area including at least a first permanent magnet part side end of the magnetic material part, and each shifted region of the magnetic material parts is formed in an entire circumferential area from the first permanent magnet part side end of the magnetic material part to a second permanent magnet part side end of the magnetic material part.

* * * * *